(12) United States Patent
Bailey (10) Patent No.: US 7,296,043 B2
(45) Date of Patent: Nov. 13, 2007

(54) MEMORY FILE SIZE ADJUSTMENT

(75) Inventor: Steven J. Bailey, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 303 days.

(21) Appl. No.: 10/448,847

(22) Filed: May 30, 2003

(65) Prior Publication Data

US 2004/0243612 A1 Dec. 2, 2004

(51) Int. Cl.
*G06F 12/00* (2006.01)
*G06F 17/30* (2006.01)
*G06F 7/00* (2006.01)
*G06F 17/00* (2006.01)

(52) U.S. Cl. .................. 707/205; 707/101; 707/2

(58) Field of Classification Search .............. 707/10, 707/205, 206; 711/170
See application file for complete search history.

(56) References Cited

U.S. PATENT DOCUMENTS

| | | | | |
|---|---|---|---|---|
| 5,293,599 A | * | 3/1994 | Kagimasa et al. | 711/159 |
| 5,388,083 A | * | 2/1995 | Assar et al. | 365/185.33 |
| 5,418,949 A | * | 5/1995 | Suzuki | 707/205 |
| 5,524,241 A | * | 6/1996 | Ghoneimy et al. | 707/10 |
| 5,574,907 A | | 11/1996 | Jernigan, IV et al. | 707/1 |
| 5,604,902 A | * | 2/1997 | Burkes et al. | 707/206 |
| 5,778,392 A | * | 7/1998 | Stockman et al. | 707/205 |
| 5,956,745 A | * | 9/1999 | Bradford et al. | 711/137 |
| 6,249,792 B1 | * | 6/2001 | Zwilling et al. | 707/205 |
| 6,408,313 B1 | | 6/2002 | Campbell et al. | |
| 6,757,801 B1 | * | 6/2004 | Best et al. | 711/170 |
| 2002/0128994 A1 | | 9/2002 | Sadhasivan et al. | 707/1 |
| 2002/0161860 A1 | * | 10/2002 | Godlin et al. | 709/219 |

FOREIGN PATENT DOCUMENTS

WO    WO 01/04801 A1    1/2001

* cited by examiner

*Primary Examiner*—Apu Mofiz
*Assistant Examiner*—Brent S Stace
(74) *Attorney, Agent, or Firm*—Woodcock Washburn LLP (57) ABSTRACT

Shrinking a database file is performed by manipulating pages within the file such that all empty pages reside at the end of the file. Non-empty pages from the end of the file are written to empty pages at the start of the file. Repeating this process, the correct number of times, results in all of the empty pages residing at the end of the file. Once this is achieved, the file is truncated such that the space consumed by all empty and discardable pages is returned to the file system. Truncating the file involves traversing the file backwards from the end of the file until the first non-empty page is found. The file is truncated after the last non-empty page.

17 Claims, 8 Drawing Sheets

| Page 1 | Page 2 | Page 3 | Page 4 | Page 5 |
|---|---|---|---|---|
| Non-Empty | Non-Empty | Non-Empty | Non-Empty | Non-Empty |

From Page 7                    From Page 9

FIGURE 4

Mapping Table 500

| Logical ID | Physical Location of Page |
|---|---|
| Logical ID | Physical Location Of Page |
| Logical ID | Physical Location Of Page |
| ... | ... |
| Logical ID | Physical Location Of Page |

54 → Logical ID column
56 → Physical Location of Page column
52 → rows

MEMORY FILE SIZE ADJUSTMENT

FIELD OF THE INVENTION

The present invention relates generally to databases, and more specifically relates to automatically resizing a database file.

BACKGROUND OF THE INVENTION

Databases and database products are in common use today. A database can store objects, such as records, tables, and indexes. Various operations performed on a database, such as deleting objects, can generate free space (memory) in the database. This free space is typically distributed throughout the database file, and thus cannot easily be removed from the database file. This free memory is problematic for databases, and particularly for mobile database products. Mobile database products are generally used on small, portable devices that have limited storage space and/or speed. Efficient use of storage is thus a goal of many mobile database products.

Current attempts to more efficiently utilize this free memory include a technique know as compacting. Compacting a database typically involves creating a new database, and then copying all objects from the source database to the new database. Compacting has the effect of not only removing empty pages from the database file, but also de-fragmenting the database. A fragmented database is one which has many non-empty pages, but the non-empty pages are only partially full. Typically, compacting is not initiated automatically (e.g., on a schedule or in response to some non-user-generated trigger) because the process of compacting is both processor and disk intensive, and thus generally takes the database out of service while the process is being performed—or, at least, slows the database to the point that the user would experience a noticeable impact on performance.

A desire exists for a technique for adjusting the size of a database that is appropriate to initiate automatically regardless of what the user is currently doing, that can be performed in the background relatively unnoticed by the user, and is relatively simple and efficient such that it can be implemented on products having a limited speed and/or memory.

SUMMARY OF THE INVENTION

The invention provides a mechanism for automatically reducing the size of a database. This mechanism, which shall be referred to as "database autoshrink," provides the capability to automatically adjust the size of database file. This autoshrink technique is capable of functioning within a multi-user environment. This technique uses relatively little processor time and memory, thus making it especially suitable for electronic devices having limited amounts of memory, such as hand held devices, and/or mobile database products. Generally, the autoshrink technique moves pages within a file such that all the empty or unallocated pages, are contiguously positioned at the end of the file. The empty and discardable pages are then truncated. The truncated pages are then available for use by the database file system. Returning the truncated pages to the database file system increases file system space.

In order to perform the autoshrink process of the present invention, a database file is traversed starting at the last page of the file and progressing toward the first page of the file. As a page is encountered, it is indicated as skipped if it is empty, or it is indicated as dirty if it is non-empty. The sum of skipped pages plus dirty pages is compared to the total number of empty pages in the file. If the sum is less than the total number of empty pages in said file, the traversal continues at the next page in the file. If the sum is greater than or equal to said total number of empty pages, the contents of the dirty pages are written to empty pages of the file that have not been traversed, and each dirty page and each skipped page is marked as unallocated. The unallocated pages are then truncated from the file.

An exemplary system for implementing this method includes a memory file comprising pages, a controller, an allocation indicator, and a truncator. The controller starts the traversal of the file at the last page of the file progressing toward the first page of the file. For each page encountered the controller indicates an encountered page as skipped if it is empty or dirty if it is non-empty. The controller compares the sum of skipped pages plus dirty pages to the total number of empty pages in said file. If the sum is less than the total number of empty pages, the traversal process continues at the next page in the file in traversal order. If the sum is greater than or equal to the total number of empty pages, the contents of the dirty pages are written to empty pages of the file that have not been traversed. The allocation indicator indicates each dirty page and each skipped page as unallocated. The truncator then truncates the unallocated pages from the file.

BRIEF DESCRIPTION OF THE DRAWINGS

The features and advantages of the present invention will be best understood when considering the following description in conjunction with the accompanying drawings, of which.

DETAILED DESCRIPTION OF ILLUSTRATIVE EMBODIMENTS

Database autoshrink in accordance with the present invention provides the capability to automatically adjust the size of a database file. Generally, the autoshrink technique moves pages within a file such that all the empty pages are contiguously positioned at one end of the file. The empty are then truncated. The truncated pages are then available for use by the database file system. Because the database file is truncated, the space returned to the file system is now available for other applications (e.g. it frees up disk space).

Figure 1:
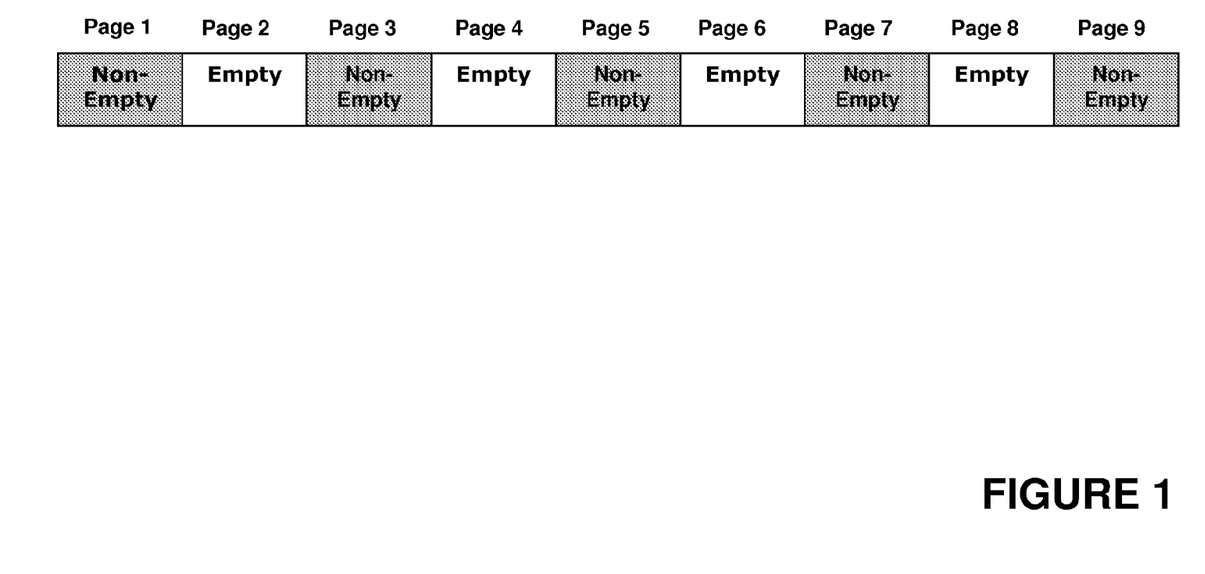
FIG. 1 is an illustration of an exemplary database file containing pages of memory, in accordance with an embodiment of the invention.

FIG. 1 is an illustration of a database file containing 9 pages of memory. FIG. 1 is presented as an example of the effect database autoshrink has on a database file. As shown in FIG. 1, pages 2, 4, 6, and 8 are empty, and pages 1, 3, 5, 7, and 9 are non-empty (shaded gray). The depicted configuration of empty, non-empty pages, and numbers of pages are exemplary. An empty page is a page containing information that is not of interest to users of the database—e.g., a page containing no data, or a page that has been deallocated by the database management system. Thus, an empty page can be discarded or used by another entity (e.g., another user). A non-empty page is a page containing content of interest to the database user(s). The file shown in FIG. 1 contains 4 empty pages and 5 non-empty pages. Although, the total number of pages in the file of FIG. 1 is 9, only 5 pages are of interest. Discarding the 4 empty pages could reduce the size of the file to as little as 5 pages.

Figure 2:
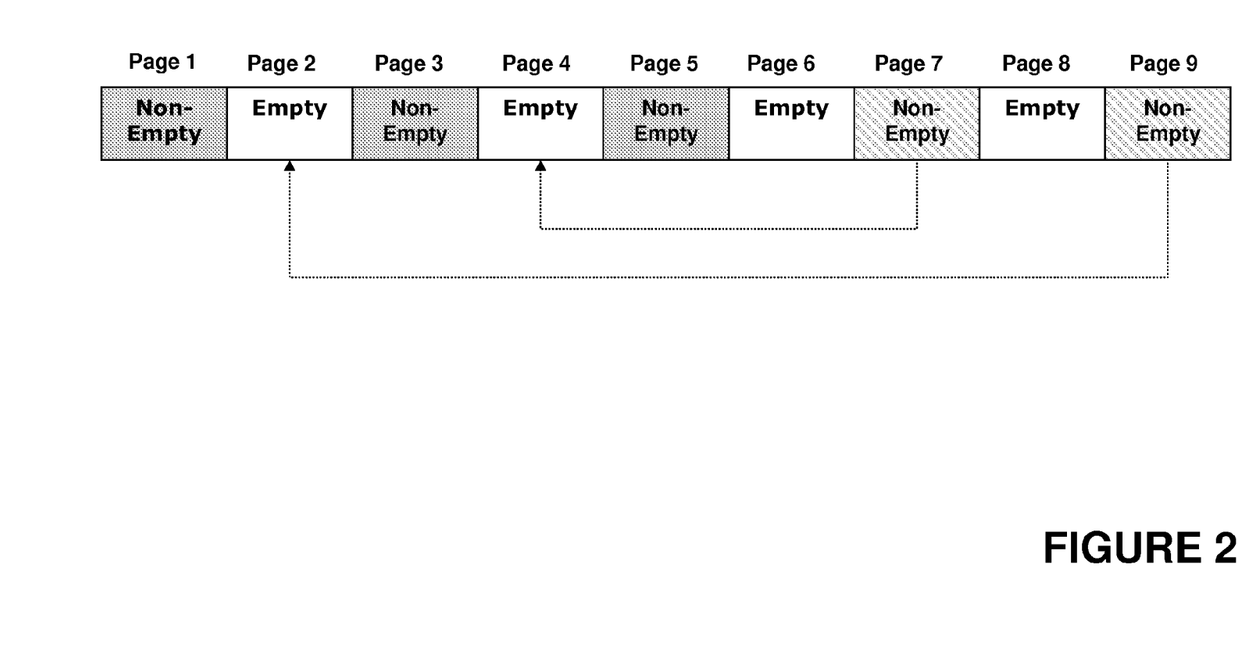
FIG. 2 is an illustration of the database file showing pages identified as pages to be written to empty pages, in accordance with an exemplary embodiment of the invention.

In an exemplary embodiment, non-empty pages from one end of the file are copied to empty pages closer to the other end of the file. For example, the contents of non-empty pages 7 and 9 (near the right side of the file) could be moved into empty pages 2 and 4 (nearer to the left side of the file). The result would be that some contiguous block of unneeded pages would reside at the end of the database file, and the file could be truncated. FIG. 2 is an illustration of the database file showing pages 7 and 9 as identified as pages to be written to empty pages. Prior to writing pages from one end of the file to the other end of the file, the pages to be written are identified. As shown in FIG. 2, pages 7 and 9 have been identified as pages to be written into empty pages, as indicated by the gray stripes. Once pages 7 and 9 have been identified, they are written into empty pages at the other end of the file. Pages 7 and 9 are written into pages 2 and 4, as indicated by the dashed arrows in FIG. 2. As shown in FIG. 2, page 7 is written to page 4 and page 9 is written to page 2. This pattern is exemplary. For example, page 7 could be written to page 2 and page 9 could be written to page 4. As long as the locations of pages are maintained, the contents of pages 7 and 9 are retrievable, regardless of the actual page in which the contents reside. The locations of pages are maintained via the use of logical identifiers (ID)s. Logical IDs and page maintenance utilizing logical IDs are described in greater detail below.

Pages 7 and 9 are selected as pages to be copied to empty pages, by starting at the end of the file (on the right side of the drawing in FIG. 2), where the pages to be copied reside, and traversing the file back toward the other end. In this example, the process starts at page 9 and proceeds toward page 1. As each page is encountered, it is determined if the page is empty or non-empty. Determining whether a page is empty or non-empty may be accomplished by any appropriate means, such as by analyzing a page header, or the like. During the traversal, as a page is encountered, it is marked as skipped if it is an empty page, and it is marked as dirty of it is a non-empty page.

Figure 3:
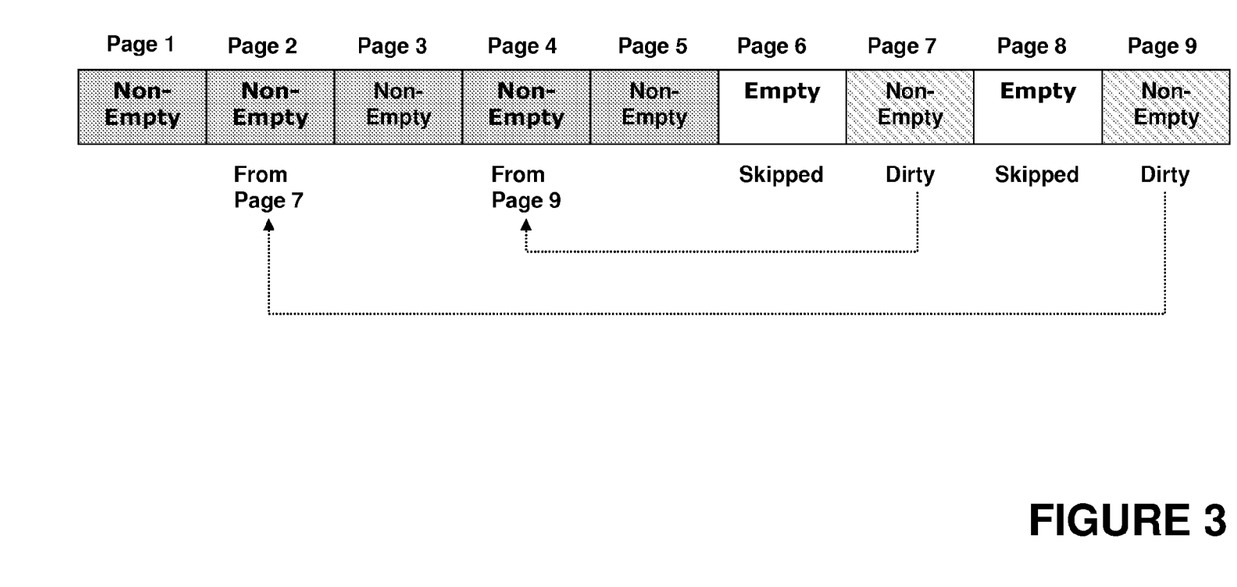
FIG. 3 is an illustration of the file showing pages marked as skipped, and pages marked as dirty, in accordance with an exemplary embodiment of the invention.

FIG. 3 is an illustration of the file showing pages 6 and 8 marked as skipped, and pages 7 and 9 marked as dirty. In this example, starting the traversal at page 9 and proceeding toward page 1, page 9 is non-empty and marked as dirty, page 8 is empty and marked as skipped, page 7 is non-empty and marked as dirty, and page 6 is empty and marked as skipped. The traversal process halts at this point, and pages 7 and 9 are written to pages 2 and 4. In one embodiment, the traversal process proceeds until the sum of the skipped pages and the dirty pages is greater than or equal to the number of empty pages in the file. This is mathematically represented as:

$$\Sigma(\text{skipped pages} + \text{dirty pages}) \geq \text{\# of empty pages in file.} \qquad (1)$$

As each page is encountered, equation (1) is evaluated, if the sum of the dirty pages and the skipped pages is less than the number of empty pages in the file, the traversal process proceeds to the next page in traversal order. If the sum of the dirty pages and the skipped pages is greater than or equal to the number of empty pages in the file, the traversal process stops, and the dirty pages are written to the empty pages contained in the portion of the file that has not been traversed. Referring to FIG. 3, the total number of empty pages in the file is 4. Starting at page 9, it is non-empty and thus marked as dirty. The sum now is equal to 1, which is less than 4, so the traversal proceeds to page 8. Page 8 is empty, and thus marked as skipped. The sum now is equal to 2, so the traversal proceeds to page 7. Page 7 is non-empty, and thus marked as dirty. The sum now is equal to 3, so the traversal proceeds to page 6. Page 6 is empty, and thus marked as skipped. The sum now is equal to 4, so the traversal process is halted. Now the content of pages 7 and 9 are written to empty pages in the portion of the file that has not been traversed. Pages 1 through 5 have not been traversed. Pages 2 and 4 are empty pages in the portion of the file that has not been traversed. Therefore, pages 7 and 9 are written to pages 2 and 4.

Figure 4:
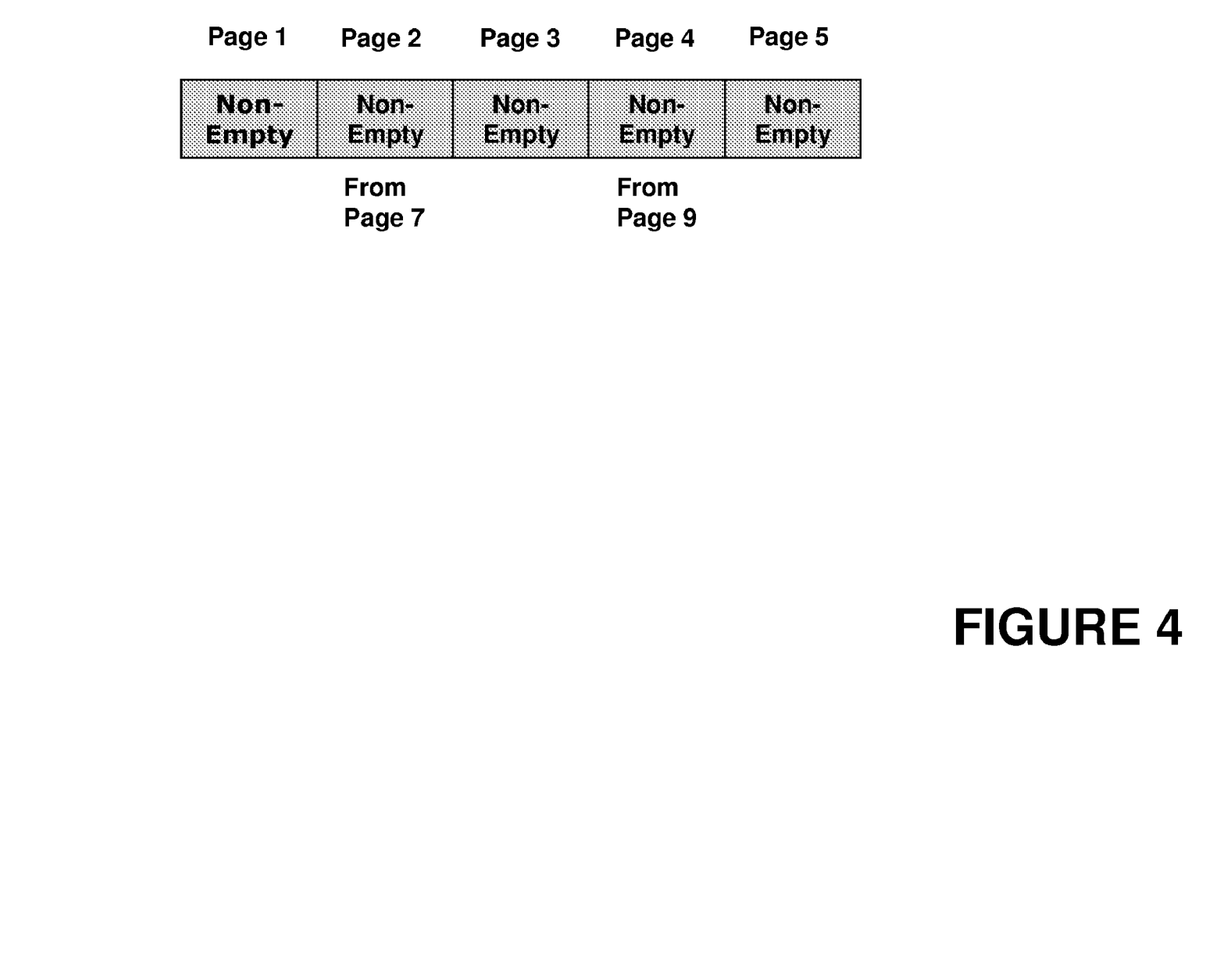
FIG. 4 is illustrates the database file upon completion of the autoshrink process, in accordance with an exemplary embodiment of the invention.

FIG. 4 illustrates the database file upon completion of the autoshrink process. The empty and dirty pages have been removed. The remaining pages are non-empty. Pages 1, 3, and 5 contain the same content as prior to the commencement of the autoshrink process. The previously empty pages, 2 and 4, now contain content from non-empty pages that were located elsewhere in the file.

In an exemplary embodiment, various controls are provided for configuring and controlling aspects of the autoshrink process. These controls may be provided at any appropriate time, for example, when opening a database. These controls include an empty page threshold, a maximum execution time limit, and a retry interval. These controls may be utilized individually or in any combination.

The empty page threshold is a value represented as a percentage of the total pages in a file. The empty page threshold may be used to start the autoshrink process. For example, the percentage of empty pages in a file may be compared to the empty page threshold. When the percentage of empty pages in the file exceeds the empty page threshold, the autoshrink process begins. Accordingly, if the empty page threshold is set to zero, the autoshrink process will commence when the first empty page exists. If the empty page threshold is set to 100%, the autoshrink process will never commence (since the entire database would have to contain no data at all in order for the percentage of empty pages to equal 100).

The maximum execution time limit limits the amount of time the autoshrink process can execute. In one embodiment, the maximum execution time limit is expressed in terms of milliseconds. By limiting the execution time of the autoshrink process, the number of CPU cycles of a system can be conserved. Setting the maximum execution time limit to infinity, allows the autoshrink process to run to completion, thus removing all of the empty pages from the database file. If the maximum execution time limit is set to a value between zero and infinity, and the autoshrink process has executed longer than the specified time, the autoshrink process will shrink the file by the number of empty pages that it was able to remove during its execution, and then stop executing. Thus, the maximum execution time limit provides the capability to incrementally reduce the size of the database file, without tying up the system for a long period of time.

The retry interval is a time value which is to elapse before the autoshrink process can re-commence (e.g., restart) after the process has been performed. The retry interval is the amount of time to wait before commencing the autoshrink process again. For example, the retry interval may be used to configure how often to keep trying to shrink a database that has an empty page percentage that exceeds the empty page threshold. The retry interval time will not take affect if the maximum execution time limit is not limited (e.g., set to infinity). When the maximum execution time is not limited, the autoshrink process will run to completion and will remove all empty pages from the file, therefore eliminating the need to retry an auto-shrink.

The following is an example of how the three controls, the empty page threshold, the maximum execution time limit, and the retry interval, may be utilized. After a transaction is committed and has been flushed to disk, it is determined if the percentage of empty pages exceeds the user-supplied empty page threshold. If the empty page threshold has been exceeded, the autoshrink process executes for the maximum execution time limit. If the autoshrink process terminates because it exceeded the maximum execution time limit, and the number of empty pages still exceeds the empty page threshold, then the autoshrink process will attempt to shrink the database file again when the auto-shrink retry interval has elapsed.

As described above, locations of pages are maintained when writing non-empty pages to empty pages. Typical database products utilize page identifiers that represent the physical addresses of the pages within a file. For example, typical database products identify each page by the page's logical offset from the beginning of the database file. However, this approach makes it difficult to move pages from one place in the database file to another, because every reference to a page must be updated to reflect the page's new location.

Figure 5:
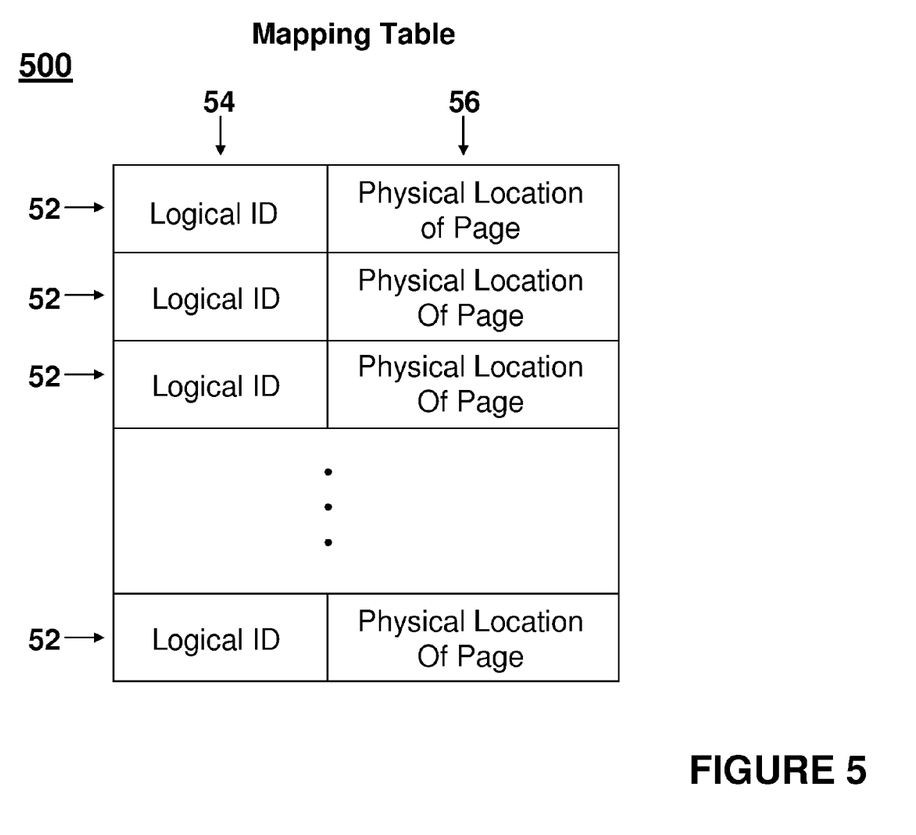
FIG. 5 is an illustration of an exemplary mapping table for mapping logical IDs to physical addresses, in accordance with an embodiment of the invention.

Thus, in an exemplary embodiment of the present invention, pages in a database file are identified by logical page identifiers (IDs). Within the database, pages are accessed and tracked using logical IDs. A logical page ID is mapped to a physical page address—i.e., the offset of the page into the file. This mapping may be accomplished by any appropriate means. In an exemplary embodiment, mapping of logical page IDs to physical addresses is accomplished via mapping tables. FIG. 5 is an illustration of an exemplary mapping table 500 for mapping logical IDs 54 to physical addresses 56. The mapping table 500 may be stored in the data base file as a set of pages. Each mapping table 500 comprises entries 52 that map a logical page ID 54 to a physical page address 56 (also referred to as a location) of a respective page of memory. When a page is accessed, the page is identified by its logical address, and mapping table 500 is used to convert the logical address to a physical address; this process is analogous to the manner in which a virtual address system uses address translation tables to map virtual addresses to physical addresses. When a physical location of a page is changed (e.g., when data is flushed to a database), its corresponding entry in the mapping table 500 is updated. For that entry, the logical page ID 54 of the page being moved does not change, but the physical address to which the page is being moved is entered into the physical location portion 56 of the entry 52 in the mapping table 500. When logical page IDs are used to identify pages, the administrative burden of moving a page from one place in the database file to another is reduced, and thus the use of logical page IDs supports the autoshrink process, which often involves moving many pages from the end of the file toward the beginning.

Referring to the above example with (See FIG. 3), when the contents of page 7 are written to page 4, the logical ID associated with those contents does not change. The physical location associated with that logical ID is updated to reflect the new location. Thus, the logical page ID associated with the contents of page 7 remains the same, and the physical address associated with that logical page ID changes from the location of page 7 to the location of page 4. The database system accesses pages by logical page IDs. In an exemplary embodiment, logical page ID are assigned specific values to indicate the type of page to which the logical ID references. For example, a certain range of logical page IDs may refer mapping table pages, and another range may refer to data pages (e.g., pages contained database context such as indices and records).

As described above, the autoshrink process in accordance with an embodiment of the present invention involves writing contents of non-empty pages to empty pages. During this process, some pages will become free and others will become used. An allocation indicator is used to provide the allocation status of pages. An allocation indicator indicates the status (available or unavailable, free or used) of logical IDs and physical pages. Any appropriate means for indicating status may be utilized. In an exemplary embodiment, a bitmap is used to indicate the allocation status of the logical IDs. The logical ID allocation bitmap contains a bit for each entry in a mapping table (e.g., mapping table 500). In an exemplary embodiment, a bit set to 1, indicates that the corresponding entry is allocated (not available). A bit is set to 0, indicates that the corresponding entry is free (available). During the autoshrink process, an available page may be located by searching for a bitmap value of zero. To indicate that the found page is now allocated, the corresponding bitmap entry is changed to 1. When the contents of a dirty page are written to an empty page, the dirty page's physical ID is marked as allocated (also referred to as used, or unavailable) and the formerly empty page's ID is marked as unallocated (also referred to as free or available).

In an exemplary embodiment, the logical ID allocation bitmap is stored in the database file as a set of pages. In another embodiment, the bitmap is initialized when the database is opened. Initialization can be accomplished by enumerating all of the page entries in the mapping table. If a page entry contains a valid physical address of a page, then the page ID corresponding to that page entry is marked as allocated. Once all entries are scanned, the bitmap now indicates the current allocation status of the page IDs.

This allocation bitmap can be stored in the database file. For example, if the maximum database file size is $2^{32}$ bytes (4 gigabytes), and the database page size is 4096 bytes, this results in a maximum of $2^{20}$ logical page IDs. The logical page ID allocation bitmap can thus be implemented using 131,072 bytes. Utilizing an allocation bitmap allows logical page IDs to be freed and/or allocated without modifying or reading the maintenance pages. This improves concurrency by allowing multiple transactions to allocate and free page IDs in a database at the same time. Utilizing an allocation bitmap also provides a robust mechanism for allocating and freeing logical page IDs, because the bitmap and the page entries are all contained within the database file.

Once the bitmap has been read into memory, or computed by scanning the page entries, allocating and freeing pages can be accomplished by counting the number of bits in the bitmap until the bit that corresponds to the page to be allocated/freed is encountered. To free a logical page ID the bit is simply changed from 1 to 0. To allocate a logical page ID the bit is simply changed from 0 to 1.

The same bitmap-type mechanism described above for allocating and freeing logical page IDs is also applicable for allocating and freeing physical page addresses. In this case, the bitmap has one bit for each physical page address in the database file. In an exemplary embodiment, a bit set to 1 indicates that the physical page address is allocated. A bit set to 0 indicates that the physical page address is free. Physical page addresses are allocated when a dirty page is written to an empty page. Adjusting memory size as described herein provides the ability to efficiently find a physical page address of an empty/unused page. In an exemplary embodiment, this physical address allocation bitmap is stored in the database file. In yet another embodiment, the physical address allocation bitmap is computed when the database is opened by scanning the database pages. If the bitmap is computed, it can be computed at the same time that the logical page ID bitmap is being computed because the same set of pages are scanned. The technique for freeing a physical page address is the same as freeing a logical page ID as described above. The technique for allocating a physical page address is almost the same as allocating a logical page ID. The difference is that if an existing physical page address is not free, then the database file is grown and the new physical page addresses appended to the database file are marked as free physical page addresses in the address bitmap.

Figure 6:
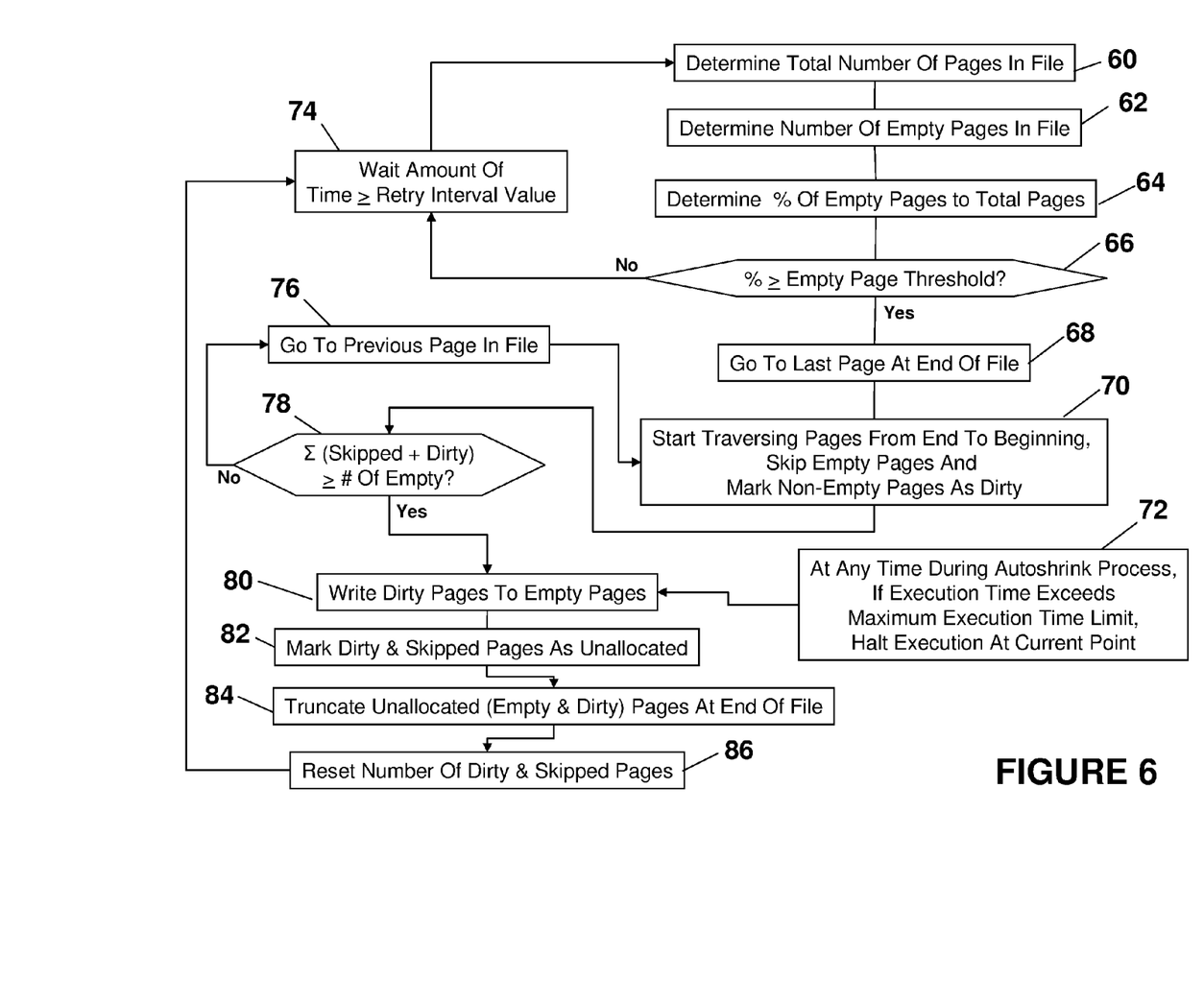
FIG. 6 is an exemplary flow diagram of a process for performing auto shrinking, in accordance with an exemplary embodiment of the invention.

FIG. 6 is an exemplary flow diagram of a process for performing auto shrinking. The total number of pages in the file is determined at step 60. The number of empty pages in the file is determined at step 62. The number may be determined by any appropriate means. Examples of appropriately determine the number of total and empty pages in a file include scanning the file and/or scanning the allocation indicator (e.g., bitmaps). In another embodiment, the total number of pages and the number of empty pages is provided to the process by the database system. The percentage of empty pages with respect to the total number of pages is determined at step 64. Any appropriate value representing this percentage may be used, for example the value may be determined by dividing the number of empty pages by the number of total pages and multiplying this quotient by 100. This may be represented mathematically as PCV, the percent value:

$$PCV = \left[\frac{NumberOfEmptyPages}{NumberOfTotalPages}\right] \times 100, \quad (2)$$

At step 66, it is determined if PCV is greater than or equal to the empty page threshold. Step 66 is optional—i.e., the empty page threshold may not have been set. If the empty page threshold is not set, then the process proceeds from step 64 directly to step 68. If the empty page threshold is set, and the PCV is less than the empty page threshold, the process proceeds to step 60 after waiting the amount of time greater than or equal to the retry interval value at step 74. If the retry interval value is set to zero, the process proceeds directly to step 60. If the retry interval value is set to infinity, the process never proceeds to step 60. It is to be understood that the order of steps 60 and 62 as depicted in FIG. 6 is exemplary, and that any order is appropriate. That is step 60 can occur before step 62, step 62 can occur before step 60, or steps 60 and 62 can occur at the same time.

At step 68, the starting point of the traversal is positioned at the last page of the file. Although step 68 depicts going to the last page at the end of the file, the traversal can start at any end of the file. For example, referring to FIG. 3, the traversal could start at page 9 and proceed toward page 1, or the traversal could start at page 1 and proceed toward page 9. In the first traversal example (right to left) the empty pages reside on the right, in the latter traversal example (left to right) the empty pages reside on the left. At step 70, the traversal process begins with a page at one end of the file. Also at step 70, as a page is encountered, if it is empty it is marked as skipped, if it is non-empty it is marked as dirty. After the encountered page is marked either dirty or skipped, the cumulative sum of skipped pages and dirty pages is compared to the number of empty pages at step 78. If this sum is less than the number of empty pages, the traversal proceeds to the next page in traversal at step 76 and the traversal process continues at step 70. If the sum of the number of dirty pages and skipped pages is greater than or equal to the number of empty pages, the dirty pages are written to empty pages at step 80. The dirty pages are written to empty pages in a portion of the file that has not been traversed. The dirty pages and the skipped pages are marked as unallocated at step 82. As described above, allocations status may be accomplished by a bitmap. The unallocated pages (dirty and skipped pages) are truncated at step 84. The number of dirty and skipped pages is reset at step 86, so that the next time step 78 is performed, the counters, for example, used to count the number of skipped pages and dirty pages have no residual values.

At any time during the process depicted in FIG. 6, if the maximum execution time has elapsed (step 72), the process jumps to step 80 and the process proceeds as described above. Thus, this autoshrink process provides the capability to incrementally shrink the database file while conserving CPU cycles.

Provided below in Table 1 is an exemplary process for adjusting file size in a database, represented in pseudo code. The following pseudo code illustrates several mechanisms for implementing the techniques described above. The pseudo code illustrates a mechanism for tracking empty and non-empty pages in a database, for determining how many pages are to be moved to one end of the file in order to shift the empty and dirty pages to the other end of the file, for writing dirty pages, and for truncating empty and dirty pages.

TABLE 1

```
class PageCollection
{
    // used to query if a page is empty or non-empty
    // this function takes the byte offset of the page within the file
    //
    bool IsPageEmpty(ULONG cbPageOffset);
    // get the total number of pages
    //
    ULONG GetTotalPageCount(void);
    // set the total number of pages in the database file
    //
    void SetTotalPageCount (ULONG cPages);
    // get the total number of empty pages
    //
    ULONG GetEmptyPageCount(void);
```

TABLE 1-continued

```
}
void ShrinkDatabase(
    PageCollection& pageCollection, // which pages are empty vs. non-empty
    BOOL fAutoShrink)     // is this shrink because of an auto-shrink?
{
    // locals
    //
    ULONG cEmptyskipped = 0;
    ULONG cMarked = 0;
    // get the total number of pages in the file
    // assume cTotalPages is always > 0
    //
    ULONG cTotalPages = pageCollection.GetTotalPageCount( );
    // get the number of empty pages in the file
    //
    ULONG cEmptyPages = pageCollection.GetEmptyPageCount( );
    // is this an auto-thrink, as opposed to a forced shrink?
    //
    if (TRUE == fAutoShrink)
    {
        // exceeding empty page threshold (knob 1)
        //
        if ((cEmptyPages * 100) / cTotalPages > KNOB1_VALUE)
        {
            // we don't need to auto-shrink
            //
            return;
        }
    }
    // compute the physical offset of the last page in the file
    //
    ULONG cbPageOffset = (cTotalPages − 1) * PAGESIZE;
    // loop until we reach the beginning of the file
    //
    while (cbPageOffset > 0)
    {
        // This is used to determine if enough pages have been
        // dirtied in order to commence flushing, all
        // or most of the empty pages end up at the end of the file.
        // This is achieved by writing dirty pages by filling
        // the empty pages at the front of the file.
        //
        if (cEmptySkipped + cMarked >= cEmptyPages)
        {
            // we are done marking pages
            //
            break;
        }
        // if we are doing an auto-shrink?
        //
        if (TRUE == fAutoShrink)
        {
            // have we exceeded the maximum execution time limit
            // this is described by knob 2 above
        }
        // determine if the page at this offset is empty?
        //
        if (true == pageCollection.IsPageEmpty(cbPageOffset))
        {
            // mark this page as dirty. This function is essentially
            // causes the non-empty page stored at this offset
            // in the file to be marked as dirty.
            // The next part of this process flushes dirty
            // pages. That mechanism is related to
            // buffer pool and transaction concepts
            // that are described in this document.
            //
            MarkPageAsDirty(cbPageOffset);
            // increment number of pages marked
            //
            cMarked++;
        }
        // otherwise...
        //
        else
        {
            // increment number of empty pages skipped
            //
            cEmptySkipped++;
        }
        // move to the previous page in the file
        //
        cbPageOffset −= PAGESIZE;
    }
    // Flush the dirty pages
    // note that this happens even if the maximum execution time limit
    // has been exceeded. This insures that progress is made toward
    // shrinking the file even if one didn't dirty as many pages as one
    // would have liked in order to shrink the entire file.
    //
    FlushDirtyPages( );
    // truncate the empty pages from the end of the file
    //
    TruncateEmptyPages( );
    // is this an auto-shrink, as opposed to a forced shrink?
    //
    if (TRUE == fAutoShrink)
    {
        // find out the total page count now
        //
        cTotalPages = pageCollection.GetTotalPageCount( );
        // find out how many empty pages there are now
        //
        cEmptyPages = pageCollection.GetEmptyPageCount( );
        // if the empty page threshold still exceeds the threshold
        // specified by knob 1? then schedule another
        //
        if ((cEmptyPages * 100) / cTotalPages > KNOB1_VALUE)
        {
            // schedule another shrink attempt using the retry interval
            // specified by knob3
            //
            ScheduleShrinkAttempt(knob3);
        }
    }
}
void TruncateEmptyPages(
    PageCollection& pageCollection) // empty vs. non-empty pages
{
    // count of how many pages will be truncated
    //
    ULONG cTruncated = 0;
    // get the total page count
    // it's assumed that there is more than one page in the file
    //
    ULONG cTotalPages = pageCollection.GetTotalPageCount( );
    // compute the physical offset of the last page in the file
    //
    ULONG cbPageOffset = (cTotalPages − 1) * PAGESIZE;
    // loop until we reach the beginning of the file
    //
    while (cbPageOffset > 0)
    {
        // looking for the last non-empty page?
        //
        if (false == pageCollection.IsPageEmpty(cbPageOffset))
        {
            // we found the last non-empty page
            //
            break;
        }
        // count how many pages we will truncate
        //
        cTruncated++;
        // move to the previous page in the file
        //
        cbPageOffset −= PAGESIZE;
    }
    // truncate the file after the last non-empty page
    //
    SetFileSize(cbPageOffset + PAGESIZE);
    // adjust the total page count
    //
    pageCollection.SetTotalPageCount(cTotalPages − cTruncated);
}
```

Figure 7:
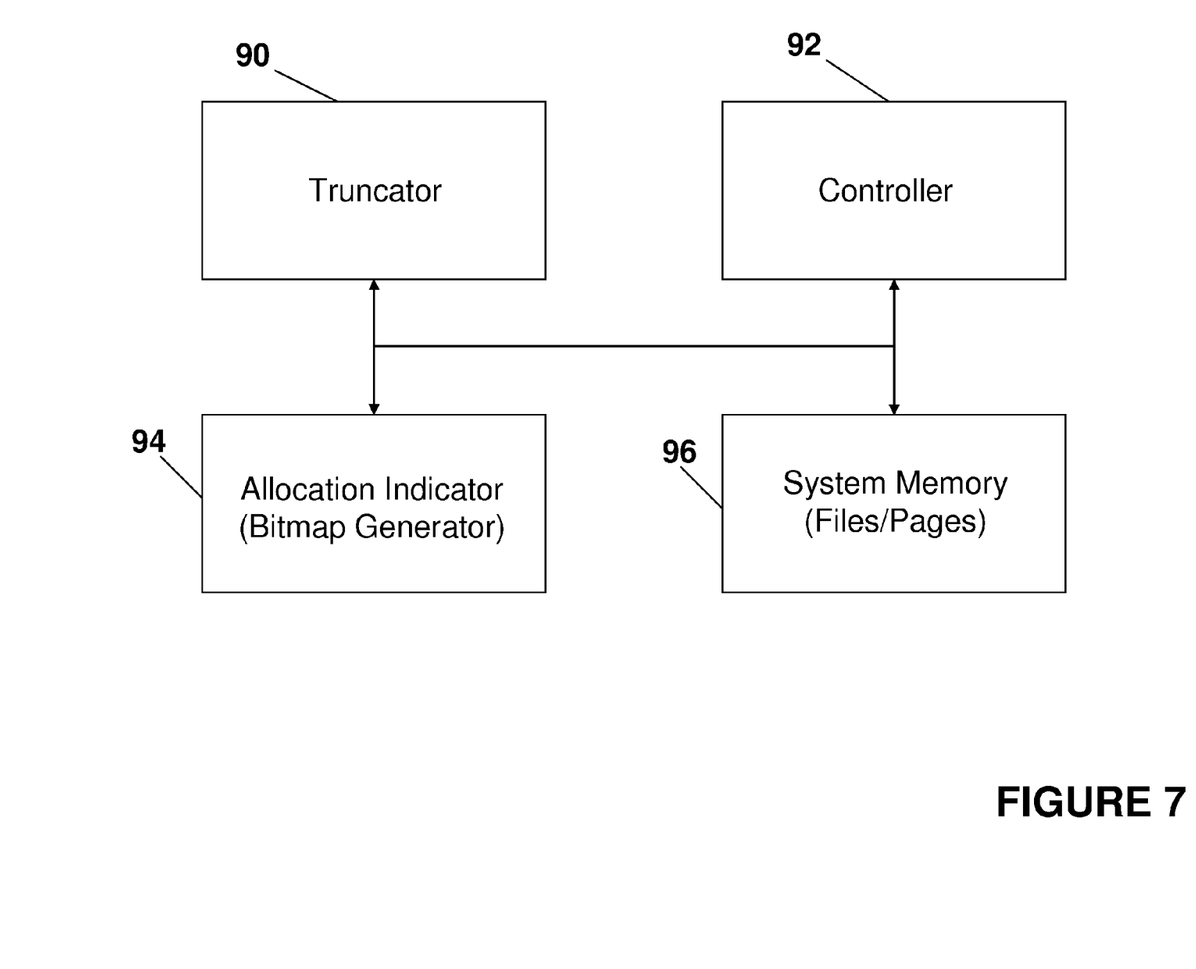
FIG. 7 is a block diagram of an system for adjusting database file size, in accordance with an exemplary embodiment of the invention.

FIG. 7 is a block diagram of an exemplary system for adjusting database file size. In an exemplary embodiment, the system is used to adjust memory size of a database, and is described in such context. The system comprises a system memory 96, an allocation indictor 94, a controller 92, and a truncator 90. The system memory 96 comprises memory pages organized into files. The system memory 96 may comprise any appropriate type of memory, such as semiconductor memory, magnetic memory (e.g., disk), optical memory, or a combination thereof. Typically and preferably, the system memory 96 comprises persistent memory possessing the capability to persistently store data. Thus, under normal operating conditions, data written to the persistent memory is available until the data is specifically removed and/or rewritten.

The allocation indicator 94 performs the functions of indicating the allocation status of the logical IDs and physical addresses of dirty and skipped pages as described above. The allocation indicator indicates an encountered page (during the traversal of a file) as skipped if the encountered page is empty. The allocations indicator indicates an encountered page as dirty if the encountered page is non-empty. The allocation indicator 94 also indicates each dirty page and each skipped page as unallocated prior to truncation, as described above. In an exemplary embodiment, the page allocation indicator 94 comprises a bitmap for indicating allocation status as described above.

The controller 92 performs many of the functions associated with adjusting memory size as described above. The controller 92 starts the traversal process at the last page at one end of a file and continues the traversal process toward the first page at the other end of the file. The controller 92 determines if the sum of skipped pages plus dirty pages is greater than or equal to the total number of empty pages in the file, and if the sum is less than the total number of empty pages in the file, continues the traversal process at the next page in the file in traversal order. If the sum is greater than or equal to the total number of empty pages, the controller writes contents of the dirty pages to empty pages of the file that have not been traversed. The truncator 90 truncates the unallocated pages from the file, as described above.

Overview of a Suitable Computing System Environment

Figure 8:
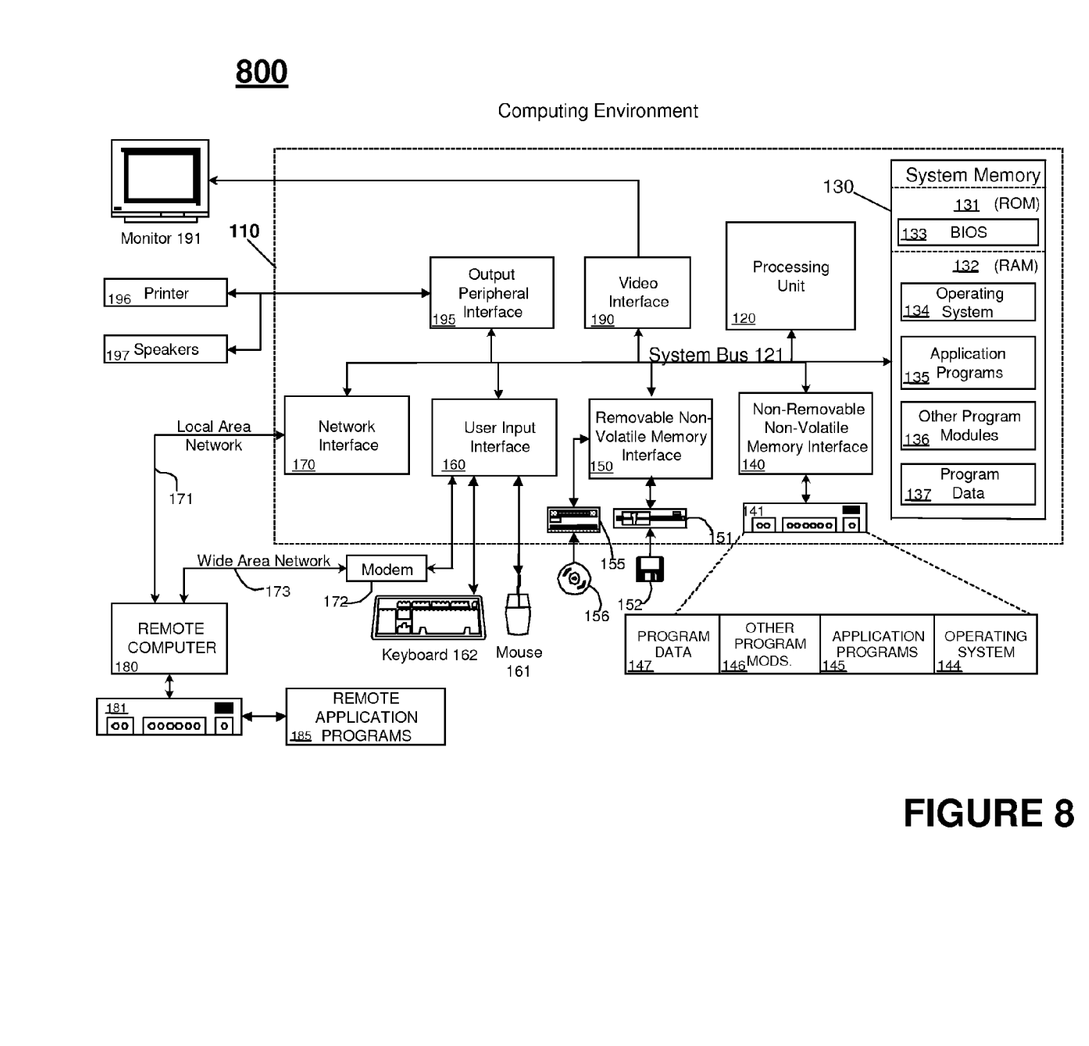
FIG. 8 illustrates an example of a suitable computing system environment in which the method and system for adjusting memory size in accordance with an exemplary of the present invention may be implemented.

FIG. 8 illustrates an example of a suitable computing system environment 800 in which the method and system for adjusting memory size may be implemented. The computing system environment 800 is only one example of a suitable computing environment and is not intended to suggest any limitation as to the scope of use or functionality of the method and system for dynamically and individually controlling display elements. Neither should the computing environment 800 be interpreted as having any dependency or requirement relating to any one or combination of components illustrated in the exemplary operating environment 800.

The method and system for adjusting memory size are operational with numerous other general purpose or special purpose computing system environments or configurations. Examples of well known computing systems, environments, and/or configurations that may be suitable for use with the method and system for dynamically and individually controlling display elements include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The method and system for adjusting memory size may be described in the general context of computer-executable instructions, such as program modules, being executed by a computer. Generally, program modules include routines, programs, objects, components, data structures, etc. that perform particular tasks or implement particular abstract data types. The method and system for adjusting memory size may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 8, an exemplary system for implementing the method and system for adjusting memory size includes a general purpose computing device in the form of a computer 110. Components of the computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. It is to be understood that combinations of any of the media are also included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, are typically stored in ROM 131. RAM 132 typically contains data and/or program modules that are immediately accessible to and/or presently being operated on by processing unit 120. By way of example, and not limitation, FIG. 8 illustrates operating system 134, application programs 135, other program modules 136, and program data 137.

The computer 110 may also include other removable/non-removable, volatile/non-volatile computer storage media. By way of example only, FIG. 8 illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM, CDRW, or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 8, provide storage of computer readable instructions, data structures, program modules and other data for the computer 110. In FIG. 8, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 8. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 8 illustrates remote application programs 185 as residing on memory device 181. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, MICROSOFT®'s NET platform includes servers, building-block services, such as web-based data storage, and downloadable device software. Generally speaking, the .NET platform provides (1) the ability to make the entire range of computing devices work together and to have user information automatically updated and synchronized on all of them, (2) increased interactive capability for web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While exemplary embodiments herein are described in connection with software residing on a computing device, one or more portions of the method and system for adjusting memory size may also be implemented via an operating system, application program interface (API), or a "middle man" object between a coprocessor and requesting object, such that services may be performed by, supported in, or accessed via all of .NET's languages and services, and in other distributed computing frameworks as well.

A method for adjusting memory size as described herein may be embodied in the form of computer-implemented processes and system for practicing those processes. A method for adjusting memory size as described herein may also be embodied in the form of computer program code embodied in tangible media, such as floppy diskettes, read only memories (ROMs), CD-ROMs, hard drives, high density disk, or any other computer-readable storage medium, wherein, when the computer program code is loaded into and executed by a computer, the computer becomes a system for practicing the invention. The method for adjusting memory size as described herein may also be embodied in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a computer, the computer becomes a system for practicing the invention. When implemented on a general-purpose processor, the computer program code segments configure the processor to create specific logic circuits.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While embodiments of the present invention has been described in connection with the illustrative embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather should be construed in breadth and scope in accordance with the appended claims.

What is claimed:

1. A method for adjusting a size of a file having a total number of empty pages, said method comprising:
    (a) starting a traversal of said file at a last page of said file and progressing toward a first page of said file;
    (b) indicating an encountered page as skipped if said encountered page is empty;
    (c) indicating said encountered page as dirty if said encountered page is non-empty;
    (d) subsequent to acts (b) and (c), comparing a sum of skipped pages plus dirty pages to the total number of empty pages in said file;
    if said sum is less than said total number of empty pages, traversing said file to a next page and performing acts (b), (c), and (d);
    if said sum is greater than or equal to said total number of empty pages:
        writing contents of said dirty pages to empty pages of said file that have not been traversed; and
        indicating each dirty page and each skipped page as unallocated; and truncating said unallocated pages from said file.

2. A method in accordance with claim 1, further comprising:
    determining if a percentage of empty pages of said file with respect to a total number of pages of said file is greater than or equal to an empty page threshold;
    if said percentage is greater than or equal to said empty page threshold, starting said traversal of said file.

3. A method in accordance with claim 1, wherein:
    dirty pages are written to said empty pages starting with a dirty page closest to said last page of said file and progressing toward said first page of said file.

4. A method in accordance with claim 1, further comprising:
    determining if a maximum execution time has elapsed since starting said traversal; and
    if said maximum execution time has elapsed, commencing said acts of:
        writing contents of said dirty pages to empty pages of said file that have not been traversed;
        indicating each dirty page and each skipped page as unallocated; and
        truncating said unallocated pages from said file.

5. A method in accordance with claim 1, further comprising:
    generating a bitmap for indicating allocation status of each dirty page and each skipped page; and
    updating said bitmap in accordance with said act of indicating each dirty page and each skipped page as unallocated.

6. A method in accordance with claim 1, further comprising:
    determining a total number of pages in said file;
    determining a number of empty pages in said file;
    determining a percent of empty pages with respect to said total number of pages;
    comparing a value of said percent with an empty page threshold value;
    if said percent is greater than or equal to said empty page threshold:
    starting a traversal of said file at a last page of said file and progressing toward a first page of said file;
        (i) indicating an encountered page as skipped if said encountered page is empty;
        (ii) indicating said encountered page as dirty if said encountered page is non-empty;

(ii) comparing a sum of skipped pages plus dirty pages to said number of empty pages;
if said sum is less than said number of empty pages, traversing said file to a next page and performing acts (i), (ii), and (iii); and
if said sum is greater than or equal to said number of empty pages:
  writing contents of said dirty pages to empty pages of said file that have not been traversed; and
  indicating each dirty page and each skipped paged as unallocated.

7. A method for adjusting a size of a file, said method comprising:
  determining a total number of pages in said file;
  determining a number of empty pages in said file;
  determining a percent of empty pages with respect to said total number of pages;
  comparing a value of said percent with an empty page threshold value;
  if said percent value is greater than or equal to said empty page threshold:
    starting a traversal of said file at a last page of said file and progressing toward a first page of said file;
    (a) indicating an encountered page as skipped if said encountered page is empty;
    (b) indicating said encountered page as dirty if said encountered page is non-empty;
    (c) subsequent to acts (a) and (b), comparing a sum of skipped pages plus dirty pages to said number of empty pages;
    if said sum is less than said number of empty pages, traversing said file to a next page and performing acts (a), (b), and (c);
      if said sum is greater than or equal to said number of empty pages:
        writing contents of said dirty pages to empty pages of said file that have not been traversed; and
        indicating each dirty page and each skipped page as unallocated; and
      truncating said unallocated pages from said file.

8. A computer readable medium encoded with a computer program code for directing a computer processor to adjust memory size having a total number of empty pages, said program comprising:
  a start code segment for causing said computer processor to (a) start a traversal of a file of said memory at a last page of said file and progressing toward a first page of said file;
  an indicate skipped code segment for causing said computer to (b) indicate an encountered page as skipped if said encountered page is empty;
  an indicate dirty code segment for causing said computer to (c) indicate said encountered page as dirty if said encountered page is non-empty;
  a compare code segment for, subsequent to acts (b) and (c), causing said computer to (d) compare a sum of skipped pages plus dirty pages to the total number of empty pages in said file;
  a next page code segment for causing said computer processor to, if said sum is less than said total number of empty pages, traverse said file to a next page and performing acts (b), (c), and (d);
  a sum greater than code segment for causing a computer processor to, if said sum is greater than or equal to said total number of empty pages:
    write contents of said dirty pages to empty pages of said file that have not been traversed; and
    indicate each dirty page and each skipped page as unallocated; and
  a truncate code segment for causing said computer processor to truncate said unallocated pages from said file.

9. A computer readable medium in accordance with claim 8, further comprising:
  a percentage code segment for causing said computer processor to determine if a percentage of empty pages of said file with respect to a total number of pages of said file is greater than or equal to an empty page threshold;
  a conditional start code segment for causing said computer processor to, if said percentage is greater than or equal to said empty page threshold, start said traversal of said file.

10. A computer readable medium in accordance with claim 8, wherein:
  dirty pages are written to said empty pages starting with a dirty page closest to said last page of said file and progressing toward said first page of said file.

11. A computer readable medium in accordance with claim 8, further comprising:
  a determine maximum time code segment for causing said computer processor to determine if a maximum execution time has elapsed since starting said traversal; and
  a conditional commence code segment for causing said computer processor to, if said maximum execution time has elapsed, commence said acts of:
    writing contents of said dirty pages to empty pages of said file that have not been traversed;
    indicating each dirty page and each skipped page as unallocated; and
    truncating said unallocated pages from said file.

12. A computer readable medium in accordance with claim 8, further comprising:
  a generate bitmap code segment for causing said computer processor to generate a bitmap for indicating allocation status of each dirty page and each skipped page; and
  a update bitmap code segment for causing said computer processor to update said bitmap in accordance with said act of indicating each dirty page and each skipped page as unallocated.

13. A system for adjusting memory size, said system comprising:
  a memory file comprising pages;
  a controller for starting a traversal of said file at a last page of said file and progressing toward a first page of said file, and for each page encountered during said traversal, the controller performing acts comprising:
    indicating an encountered page as skipped if said encountered page is empty;
    indicating said encountered page as dirty if said encountered page is non-empty;
    subsequent to the acts of indicating an encountered page as skipped if said encountered page is empty and indicating said encountered page as dirty if said encountered page is non-empty, comparing a sum of skipped pages plus dirty pages to a predetermined total number of empty pages in said file;
    if said sum is less than said predetermined total number of empty pages, continuing said traversal at a next page in said file in traversal order; and
    if said sum is greater than or equal to said predetermined total number of empty pages, writing contents of said dirty pages to empty pages of said file that have not been traversed;
  an allocation indicator for indicating each dirty page and each skipped page as unallocated; and
  a truncator or truncating said unallocated pages from said file.

14. A system in accordance with claim 13, wherein said controller further:
- determines if a percentage of empty pages of said file with respect to a total number of pages of said file is greater than or equal to an empty page threshold;
- if said percentage is greater than or equal to said empty page threshold, starts said traversal of said file.

15. A system in accordance with claim 13, wherein:
- dirty pages are written to said empty pages starting with a dirty page closest to said last page of said file and progressing toward said first page of said file.

16. A system in accordance with claim 13, said controller further:
- determines if a maximum execution time has elapsed since starting said traversal; and
- if said maximum execution time has elapsed, commences:
    - writing contents of said dirty pages to empty pages of said file that have not been traversed;
    - indicating each dirty page and each skipped page as unallocated; and
    - truncating said unallocated pages from said file.

17. A system in accordance with claim 13, wherein:
- said allocation indicator comprises a bitmap for indicating allocation status of each dirty page and each skipped page; and
- said controller updates said bitmap in accordance with said act of indicating each dirty page and each skipped page as unallocated.

* * * * *